Patented Oct. 21, 1930

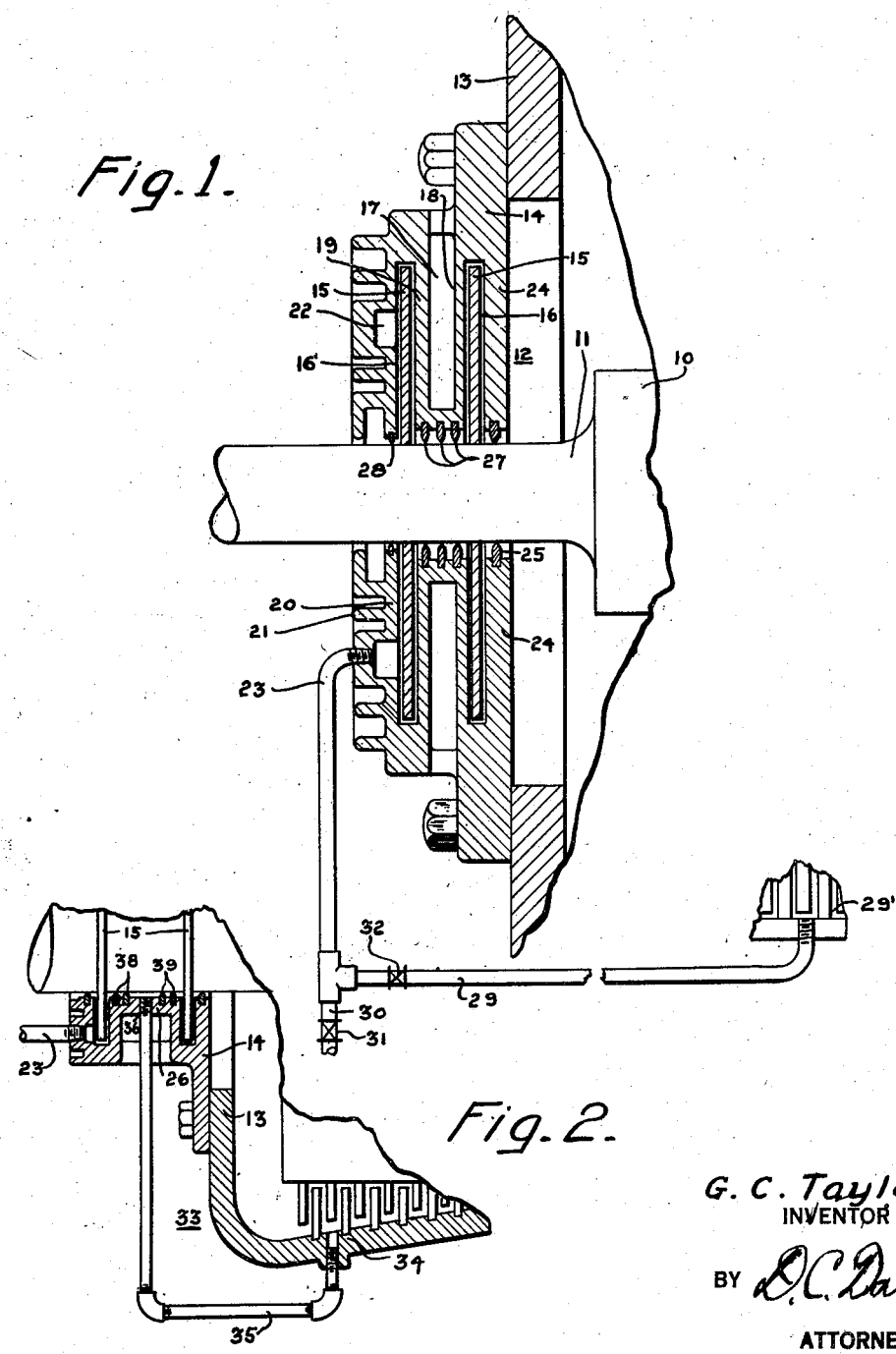

1,779,055

UNITED STATES PATENT OFFICE

GEORGE C. TAYLOR, OF PHILADELPHIA, PENNSYLVANIA, ASSIGNOR TO WESTINGHOUSE ELECTRIC AND MANUFACTURING COMPANY, A CORPORATION OF PENNSYLVANIA

GLAND

Application filed November 5, 1923. Serial No. 673,003.

My invention relates to glands for packing rotary members, such as turbine shafts, and it has for its object to provide apparatus of the character designated which shall be capable of using the condensate of a condensible fluid as a sealing medium.

A further object of my invention is to provide an air-cooled housing for gland discs so that steam entering the gland may be condensed to constitute the sealing medium.

A further object of my invention is to provide air-cooled gland discs which use the condensate of a condensible fluid as a sealing medium against pressure either from within or without a fluid-actuated turbine.

Glands for steam turbines and like apparatus may be roughly divided into two general groups, i. e., those which seal against pressures above atmosphere (used for non-condensing turbines) and those which seal against pressures below atmosphere (used for condensing turbines).

In glands used for condensing operation it is advisable to admit steam or water from an outside source to serve as the sealing medium and thus prevent the entrance of air into the turbine or condenser.

In the water-sealed type of gland, water may be introduced from an outside source to form the sealing medium. One of the principal advantages of this type is that it may be used to seal either against pressures above atmosphere, or against pressure below atmosphere. Hence it may be used on turbines which operate either condensing or non-condensing. One of the disadvantages, however, is the necessity for providing a sealing medium from an outside source. Another disadvantage is that the gland requires the centrifugal action of rotation to form a seal across the opening between the rotating shaft and the stationary casing. Obviously, a decrease in rotational speed of the shaft decreases the effectiveness of the seal, and when the shaft does not rotate there may be no seal.

In the steam sealed type of gland, steam may be admitted from an outside source to serve as the sealing medium. One of the principal advantages of this type is that the effectiveness of the seal is undisturbed regardless of shaft rotation.

It is the specific object of my invention to provide a gland which has the advantages of both the steam and the water sealed type, but with none of the disadvantages peculiar to either type. It is suitable for all conditions of operation, and may utilize a single medium for sealing, namely, steam from the interior of the turbine. To this end, I provide a rotor shaft with one or more thin discs of relatively large diameter which are surrounded by a housing having thin or air-cooled walls so that at least a portion of the steam entering the gland from the turbine housing may be condensed to constitute a water seal. With this construction, even through the turbine speed should be so low as to be incapable of maintaining a fluid seal, yet steam entering the housing between the disc or discs and the interior walls thereof is sufficient to constitute an adequate seal. However, I propose the use of a housing which fits discs with relatively close clearance so that, for all practical turbine speeds, the discs are capable of maintaining a water seal.

Apparatus made in accordance with my invention is illustrated in the accompanying drawing, forming a part of this application in which Fig. 1 is a sectional detail view showing a gland made in accordance with my invention, and Fig. 2 is a sectional view showing a modification of my invention adapted for a turbine which at times is run condensing and at other times non-condensing.

Referring now to the drawings for a better understanding of my invention, I show in Fig. 1, a rotor 10 having a shaft 11 which passes through a gland, at 12, supported by a turbine housing 13.

The gland, at 12, consists of a housing 14, which surrounds one or more relatvely thin discs 15 with close clearance. As illustrated, I show two such discs 15 and the housing 14 is provided with chambers 16 and 16' which surround the discs 15, circumferentially and laterally with a relatively close degree of clearances.

The housing structure 14 is so modified that one or more walls of the chambers 16 and 16' are air-cooled. Hence, I provide an air space 17 between the laterally thin walls 18 and 19 of the chambers 16 and 16' so that steam in the chambers may be condensed to establish a liquid seal. In addition to the thin walls 18 and 19, the outer wall 20 of the outermost chamber 16' may also be provided with cooling fins 21 for the same purpose. As shown, the outer wall is also provided with a leak-off channel 22 communicating with a leak-off passage 23 so that surplus condensate may escape from the gland. The leak-off pipe 23 has a branch 29 which communicates with a stage of a turbine 29' where suitable pressure for condensing and forming a seal may be obtained when the turbine is running condensing, and a branch 30 leading to the atmosphere. A valve 31 in the branch 30 is open permitting leakage of condensate to the atmosphere when running non-condensing and is closed when running condensing. A valve 32 in the branch 29 is closed when the turbine is running non-condensing and open to permit steam to pass to the gland when running condensing.

In order to minimize the passage of steam from the interior of the turbine casing 13 to the chamber 16, I provide the wall 24 with any suitable packing 25 cooperating with the shaft 11; and, in order to resist leakage from the chamber 16 to the outer chamber 16', the adjacent walls 18 and 19 are connected by a cylindrical portion 26 having packing 27 with respect to the shaft 11. Packing 28 is also provided between chamber 16' and the outer wall 20 to prevent leakage of sealing liquid between the wall 20 and the rotor.

From the structure thus far described, the operation of apparatus made in accordance with my invention will be apparent. Steam leaks by the packing 25 from the interior of the turbine and enters the chamber 16. It then passes radially outward, around the periphery of the disc 15 of this chamber, and then radially inward on the other side of the disc. Such steam as leaks by the packing 27 from the chamber 16 enters the chamber 16', travels radially outward of its disc 15, around the periphery of this disc, and then radially inward on the other side. The rotation of the discs 15 by contact with the steam imparts to it a rotary movement, which, together with the radially outward and radially inward movement, produces a resultant spirally outward and spirally inward path. The thin walls 18 and 19 and the finned wall 20 serve to air cool the chambers and effect sufficient condensation to produce adequate water to form a liquid seal. The water is urged radially outward by the centrifugal force imparted to it by the discs 15 and forms an annulus at the bottom or outer portion of each of the chambers 16 and 16'. This results in an effective water seal between the discs 15 and chambers 16 and 16'. The discs 15 are of such diameter and the clearances are sufficiently close so that, with the cooperation of the packing 25 and 27, an effective steam seal is had if there is insufficient condensation to effect a water seal or when operating at speeds too low to maintain the water seal.

I have illustrated the operation of my invention by assuming that it is applied to a non-condensing turbine, that is, with the pressure inside the casing greater than without the casing, the steam passing from the interior of the casing outward into my improved gland structure where it is condensed and forms a seal. It is obvious, however, that it would be equally effective when used in connection with a condensing turbine or where the pressure within the casing at the end where the gland is applied is less than the pressure without the casing.

In such a case, valve 31 is closed and steam is admitted to the gland from a suitable stage of a turbine 29' through the pipe 29, the open valve 32 and pipe 23 which acts as a leak-off pipe when the turbine is being operated non-condensing, and is condensed within the chamber 16'. Condensate then passes around the outer disc 15 and thence to the inner chamber 16 in an opposite direction to that outlined where the turbine is being operated non-condensing. Condensate passing the packing provided around the rotor leaks off into the interior of the casing from whence it passes to the condenser. Leakage to the outside is prevented by the packing 28 combined with the pressure outside the casing. Steam admitted through the pipe 23 to the gland may be taken from any desired source, though I prefer taking it from an interstage of the turbine where a suitable pressure may be obtained.

In Fig. 2, I show a modification of my invention suitable for application to a turbine 33 which at times is operated condensing and at other times non-condensing. In this figure the principal parts of the gland are similar in construction to those illustrated in Fig. 1 and need no further description. In this modification, however, I take steam from a stage at 34 of the turbine where a suitable pressure may be obtained, and conduct it through a pipe 35 to an inlet 36 in the cylindrical portion 26 of the gland. Packing means 38 and 39 are provided between the cylindrical portion 26 of the gland and the shaft 11 of the turbine.

The operation of apparatus made in accordance with this modification is apparent. Steam from the turbine at 34 passes through the pipe 35 and enters the cylindrical portion 26 of the gland at 36 and leaks by the packing means 38 and 39 into the chambers surrounding the discs 15 where it is condensed and forms a liquid seal. If the turbine is being operated non-condensing, excess condensate leaks off through the leak-off pipe 23; if being operated condensing it leaks off into the interior of the turbine.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A packing gland for the shaft of a turbine comprising an annular chamber having an outer peripheral and two radial walls and open at its inner periphery, the two radial walls of said chamber being exposed to cooling medium for condensing elastic fluid which escapes from the casing of the turbine, and a rotatable element extending radially outwardly and disposed within the chamber for forming and maintaining a sealing annulus of the condensate produced therein against the outer periphery of the chamber.

2. A packing gland for the rotor of an elastic fluid turbine comprising a stationary casing communicating with the turbine casing and spaced therefrom, the walls of said stationary casing being exposed to the cooling effect of the atmosphere for effecting condensation of the elastic fluid passing therethrough, a rotatable disc so disposed in the stationary casing that the escaping elastic fluid is compelled to pass outwardly from the shaft and inwardly toward the shaft between the disc and the air-cooled walls of the stationary casing, whereby condensation of the elastic fluid is effected, said disc when in rotation adapted to maintain said condensate against the outer periphery of the stationary casing for forming a liquid seal between the disc and stationary casing, and condensate outlet means provided in the stationary casing.

3. A packing gland for sealing the rotor of a turbine comprising a stationary casing communicating with the turbine casing and including two radial air cooled walls exposed to the atmosphere, a rotatable disc disposed in the casing between said radial walls so that the escaping elastic fluid is compelled to pass spirally outward from the rotor and spirally inward toward the rotor between the disc and the air cooled walls of the casing, whereby condensation of the elastic fluid is effected, said disc when in rotation adapted to maintain said condensate against the outer periphery of the casing for forming a liquid seal between the disc and casing, and condensate outlet means for the casing located above the bottom thereof and below the rotor so as to retain therein a substantial body of condensate for sealing purposes.

4. A packing gland for the rotor of a turbine comprising a plurality of gland casings connected to the casing of the turbine and to each other, one of said casings including two radial air cooled walls exposed to the atmosphere and the other casing including at least one thin radial air cooled wall exposed to the atmosphere, a rotatable disc so disposed between the walls in each casing that elastic fluid escaping from the turbine is compelled to pass successively between the disc and the air cooled walls of each casing, whereby condensation of the elastic fluid is effected, said disc when in rotation adapted to maintain said condensate against the outer periphery of the casing for forming a liquid seal between the disc and casing, and condensate outlet means for one of the casings arranged above the bottom thereof and below the rotor so that a substantial body of condensate is retained therein for sealing purposes.

5. A packing gland for the shaft of an elastic fluid turbine comprising a chamber communicating at its inner periphery with the turbine casing, said chamber having air cooling means for effecting condensation of elastic fluid passing therethrough to form a sealing annulus, said chamber being spaced from the casing to provide a recess in which may be disposed a medium shielding said chamber from the heat emanating from the interior of the turbine, and a rotating impeller member disposed within the chamber for maintaining the sealing annulus against the outer periphery of the chamber.

6. A packing gland for the shaft of a turbine comprising a chamber having air cooling means for condensing elastic fluid which may escape from the casing of the turbine, said chamber being spaced from the casing to provide a recess in which may be disposed a medium shielding said chamber from the heat emanating from the interior of the turbine, a rotatable element disposed within the chamber for forming a sealing annulus of the condensate produced therein, means for removing excess condensate when the pressure within the turbine is above atmospheric pressure, and means for supplying condensable elastic fluid to said chamber when the pressure in the turbine is below atmospheric pressure.

7. A packing gland for the shaft of an elastic fluid turbine comprising a chamber communicating with the turbine casing at its inner periphery, said chamber having air cooling means for effecting condensation of condensable elastic fluid passing therethrough to form a sealing annulus, said chamber being spaced from the casing to provide a recess in which may be disposed a medium shielding said chamber from the heat emanating from the interior of the turbine, a rotating impeller member disposed within the chamber for maintaining the sealing annulus against the outer periphery of the chamber, a conduit having lateral communication with the chamber, a valve in said conduit for permitting the outlet of excess condensate when the pressure within the turbine is above atmospheric pressure, and means communicating with the turbine for supplying condensable elastic fluid to the chamber when the pressure in the turbine is below atmospheric pressure.

8. A packing gland for sealing the rotor of a turbine against leakage comprising a disc secured to said rotor, a casing enclosing said disc and having thin air-cooled radial walls on opposite sides of the disc to form a narrow condensing passage therewith, communicating means between the turbine and one side of the casing at the inner periphery thereof, said disc when in rotation maintaining a sealing annulus at the outer periphery of the interior of the casing.

In testimony whereof, I have hereunto subscribed my name this 29th day of October, 1923.

GEORGE C. TAYLOR.